US012324940B2

(12) United States Patent
Vingerhoets

(10) Patent No.: US 12,324,940 B2
(45) Date of Patent: Jun. 10, 2025

(54) SYSTEM AND METHOD FOR DETECTING AND SUPPRESSING DUST EXPLOSIONS

(71) Applicant: Fike Corporation, Blue Springs, MO (US)

(72) Inventor: Jim Vingerhoets, Rijkevorsel (BE)

(73) Assignee: Fike Corporation, Blue Springs, MO (US)

( * ) Notice: Subject to any disclaimer, the term of this patent is extended or adjusted under 35 U.S.C. 154(b) by 726 days.

(21) Appl. No.: 17/704,209

(22) Filed: Mar. 25, 2022

(65) Prior Publication Data

US 2022/0305316 A1 Sep. 29, 2022

Related U.S. Application Data

(60) Provisional application No. 63/165,802, filed on Mar. 25, 2021.

(51) Int. Cl.
*A62C 3/04* (2006.01)
*A62C 37/40* (2006.01)

(52) U.S. Cl.
CPC ................ *A62C 3/04* (2013.01); *A62C 37/40* (2013.01)

(58) Field of Classification Search
CPC .......... A62C 3/04; A62C 37/40; G08B 17/04; G08B 17/06
USPC ............................ 169/20, 28, 45, 46, 54, 70
See application file for complete search history.

(56) References Cited

U.S. PATENT DOCUMENTS 5,119,877 A 6/1992 Sapko et al.
6,031,462 A 2/2000 Van den Schoor et al.

FOREIGN PATENT DOCUMENTS

CN 106581916 4/2017
CN 110389152 10/2019
CN 112162010 1/2021

OTHER PUBLICATIONS

International Search Report and Written Opinion in corresponding PCT/US2022/021851, dated Jul. 13, 2022.

*Primary Examiner* — Jason J Boeckmann
(74) *Attorney, Agent, or Firm* — Hovey Williams LLP

(57) ABSTRACT

A system (10) and method (100) for detecting and suppressing a dust explosion occurring in a process enclosure (12). A sensor (14) generates a pressure signal indicative of a pressure within the enclosure (12). A processing element (16) analyzes the signal to determine whether the dust explosion is occurring. The signal is sampled at a higher frequency, and then converted to a lower frequency by averaging, then filtered with first and intermediate filters to remove portions of the signal having rates of increase that exceed pre-established maximum magnitudes, and then filtered with a second filter having an appropriate cut-off frequency, stop band attenuation factor, and end of passband frequency. An alarm and a suppression system (18) are activated if a static pressure exceeds a limit, a rate of pressure increase exceeds a limit, or a total suppressed pressure exceeds a limit, each of which indicates occurrence of the dust explosion.

31 Claims, 4 Drawing Sheets

SYSTEM AND METHOD FOR DETECTING AND SUPPRESSING DUST EXPLOSIONS

RELATED APPLICATION

The present application claims the benefit of U.S. Provisional Patent Application No. 63/165,802, filed Mar. 25, 2021, and is incorporated by reference herein in its entirety.

BACKGROUND OF THE INVENTION

Field of the Invention

The present invention is broadly concerned with detecting and suppressing dust explosions in process enclosures associated with, for example, dryers, mills, conveyors, silos, dust collectors, and other such material processing equipment.

Description of the Prior Art

A risk of dust explosions arises in material processing equipment involving powdered material and heat, such as dryers, mills, conveyors, silos, dust collectors and other process equipment in which an explosive dust-air cloud may arise during normal operation or during malfunction. For example, in spray dryers a liquid or slurry of a product is atomized to small droplets and then dried by sudden contact with hot air to powder particles having particular particle sizes. Such spray dryers can be found in the food and diary industries, where they are used, for example, in the production of milk powder, cacao, and coffee powder, and also in the pharmaceutical and chemical industries. Slow exothermic reactions of powder deposits in hot regions of their drying chambers may evolve over a critical residence period into smoldering fires, which may ultimately result in open flames and/or dust explosions. As such, it is desirable to employ systems for detecting and suppressing dust explosions in such equipment.

A conventional explosion suppression system includes one or more pressure sensors, one or more high rate discharge suppressors with dispersion nozzles, and a control unit. When a cloud of dust ignites, the flame front expands and pressure waves are emitted. The pressure sensor detects the increase in pressure and sends a signal to the control unit, which, in turn, initiates discharging a suppressant agent. The suppressant agent is rapidly released into the process enclosure and extinguishes the fireball by reducing the temperature of the combustible material below the level necessary to sustain combustion.

A suppression response may be triggered either when the static pressure within the enclosure reaches a pre-established threshold value, the static alarm pressure, or $P_{set}$, or when the dynamic rate of increase in pressure within the enclosure reaches a pre-established threshold value, the dynamic alarm rate, or $dP/dt_{set}$. The injected suppressant agent extinguishes the ongoing combustion and limits the explosion pressure to the Total Suppressed Pressure (TSP), which typically is much lower than the maximum pressure, $P_{max}$, which would be generated by uncontrolled combustion. Thus, the pressure shock resistance of the equipment under protection should exceed the TSP. The TSP is expressed as:

$$TSP=P_{act}+P_{N2}+P_{comb}$$

wherein $P_{act}$ is the activation pressure of the sensor; $P_{N2}$ is the pressure due to injection of nitrogen (or other inert gas) into the vessel; and $P_{comb}$ is the combustion pressure associated with flame growth (after $P_{act}$ has been reached). Suppression is an active response that has several advantages over conventional venting. In particular, suppression avoids the release of pressure, flame, or potentially toxic material into the environment because the explosion is contained within the process enclosure. Suppression also reduces damage to the equipment and mitigates potential fire hazards which can arise after an explosion.

When using static pressure detection, spurious triggers can be avoided by choosing an alarm pressure at least a minimum (e.g., 35 mbarg) above the highest foreseeable process pressure and by applying a minimum time filter of, e.g., 3 ms duration: $P(t)>P_{set}$ for 3 consecutive milliseconds, wherein P(t) is the measured explosion pressure. The use of a time filter leads to a delay in activation ($P_{act}>P_{set}$) and a higher maximum suppressed explosion pressure.

Dynamic pressure detection is used with, for example, processes that run in vacuum conditions or processes at risk of exploding with a high maximum rate of pressure rise and which require that the suppression system be activated when the explosion pressure is still less than the required minimum (e.g., 35 mbar) above the highest foreseeable process pressure in order to keep the total suppressed pressure from exceeding the strength of the process equipment. The system is activated when the rate of increase of explosion pressure reaches the pre-established dynamic alarm rate, $dP/dt_{set}$. Foreseeable and unforeseeable pressure rate increases due to the process will be below the alarm rates required for timely activation (e.g., 1 bar/s). However, short duration pressure reading disturbances of mechanical or electrical origin may exceed the alarm rate. A time filter can remove these disturbances but compromises the detection when an incipient explosion occurs, because of the pressure reading noise caused by reflections of explosion pressure waves against the walls of the process enclosure. Due to the pressure fluctuations of the reflection waves during the explosion, the pressure rate of rise values tend not to exceed a certain threshold value for 3 consecutive milliseconds.

In both cases, the static alarm threshold ($P_{set}$) or the dynamic alarm threshold ($dP/dt_{set}$) is determined off-line by the suppression system designer and pre-established in the detection system. The $P_{set}$ or $dP/dt_{set}$ is chosen by the system designer such that the expected TSP remains under the pressure shock resistance of the equipment under protection. For this purpose, the system designer uses an explosion prediction model where an upper estimate of the combustion pressure $P_{comb}$ is expressed as:

$$P_{comb}=dP/dt_{act}*SRT$$

wherein $dP/dt_{act}$ is the rate of explosion pressure rise at the moment of activation of the suppression system, and SRT (System Reaction Time) is the time needed for the suppression system to extinguish the explosion after activation. The SRT value is determined by testing and is governed by the speed and amount of suppressant powder injection, the dimensions of the protected equipment and the fuel type (e.g., hydrocarbon, metal). The relationship between $P_{act}$ and $dP/dt_{act}$, which is needed to close the system design process, is modelled based on the physics and chemistry of the combustion process in a confined enclosure, for example using the equation ( $$\frac{dP}{dt_{act}} = \frac{3(P_{max}-P_0)}{R_{enclosure}}\left[1-\left(\frac{P_0}{P_{act}}\right)^{1/1,4}\frac{P_{max}-P_{act}}{P_{max}-P_0}\right]^{2/3}\left(\frac{P}{P_0}\right)^{1/1,4}S_u$$

and is therefore dependent on the enclosure dimension ($R_{enclosure}$—equivalent radius of enclosure volume) explosion intensity ($S_u$—burning velocity, $P_{max}$—maximum explosion pressure in an unsuppressed enclosure) and the initial process pressure at the moment the explosion is ignited ($P_0$).

Most of the design parameter values are controllable and fixed over time, except the process pressure at the moment the explosion is ignited and the intensity of the dust explosion. Conventionally, the explosion intensity is taken to be the maximum that is experimentally found under standardized dust cloud conditions. This approach has several drawbacks. In many cases, it results in low alarm threshold values and, consequently, an increased probability of spurious tripping. Often, the low alarm thresholds are not needed because the effective explosion is less intense than the system is designed for due to, e.g., lower than optimum dust concentration or lower than standard dust cloud turbulence. Furthermore, the properties of the processed dust can change over time due to, for example, differences between batches, new suppliers, or changes in the process. In some cases, processing conditions may enhance the dust explosion intensity compared to the intensity measured under standardized dust cloud conditions, such as when turbulent process air mixtures are generated. Thus, the intensity of a dust explosion may exceed the design value. Additionally, the process pressure can change over time due to, for example, changed fan operation or piping layout. If the alarm threshold is not lowered accordingly, explosions initiated in lower than anticipated process pressures may be trapped too late by the detection system.

SUMMARY OF THE INVENTION

The present invention overcomes the problems outlined above and provides an explosion suppression system and associated method which provide faster and more reliable activation, and which are less influenced by variations in process parameters and explosion intensity. More specifically, the present invention uses an innovative digital filter technique in dynamic detection to provide improved stability against short duration pressure reading disturbances and uses floating detection where not preset values for static pressure threshold or dynamic rate of pressure rise thresholds are used to activate the system, but where rather the real-time measured pressure and rate of pressure rise is compared against a preset threshold for the final maximum allowed explosion pressure in the system.

In an exemplary embodiment, the present invention may be characterized as a method for detecting and suppressing a dust explosion occurring in a process enclosure, and broadly comprising the following steps. A pressure sensor may generate a pressure signal indicative of a pressure within the process enclosure, and an electronic processing element may analyze the pressure signal as follows to determine whether the dust explosion is occurring. The processing element may sample the received pressure signal at a higher frequency, and then convert the sampled pressure signal from the higher frequency to a lower frequency. A first filter may filter the converted pressure signal to remove a first portion of the pressure signal having a rate of increase that grows over one millisecond with more than a first pre-established maximum magnitude. An intermediate filter may remove a second portion of the first filtered pressure signal having a rate of increase exceeding a second pre-established maximum magnitude. A second filter may filter the intermediate filtered pressure signal, wherein the second filter has a cut-off frequency, a stop band attenuation factor, and an end of passband frequency. The processing element may activate a suppression system if the first filtered pressure signal exceeds a pre-established static pressure threshold value or if the rate of increase of the second filtered pressure signal exceeds a pre-established rate-of-increase threshold value or if the total suppressed pressure predicted on the basis of the first and second filtered pressure signal exceeds a pre-established equipment strength value, each of which indicates the dust explosion occurring in the process enclosure.

Various implementations of the foregoing embodiment may include any one or more of the following additional features. The process enclosure may be selected from, for example, dryers for drying powdered materials, mills for reducing solid materials to smaller pieces, conveyors for transporting solid bulk materials, silos for storing solid bulk materials and dust collectors for separating dust particles from an air stream. The higher frequency may be approximately between 2 kHz and 20 kHz, or approximately 16 kHz, and the lower frequency may be approximately between 500 Hz and 1500 Hz, or approximately 1000 Hz. The first filter may be a non-linear filter. The first pre-established maximum magnitude may be approximately between 20 bar/s and 40 bar/s, or approximately 30 bar/s. The intermediate filter may be a non-linear filter. The second pre-established maximum magnitude may be approximately between 5 bar/s and 15 bar/s, or approximately 10 bar/s. The second filter may be a digital low pass filter, or a finite impulse response digital low pass filter. The cut-off frequency may be approximately between 40 Hz and 120 Hz, or approximately between 50 Hz and 120 Hz, the stop band attenuation factor is approximately between 8 and 12, or approximately 10, and the end of passband frequency is approximately between 0 Hz and 2 Hz, or approximately 1 Hz. The method may further include activating an alarm in addition to the suppression system.

DETAILED DESCRIPTION OF THE PREFERRED EMBODIMENTS

Figures 1A, 1B, 1C, 1D, 1E:
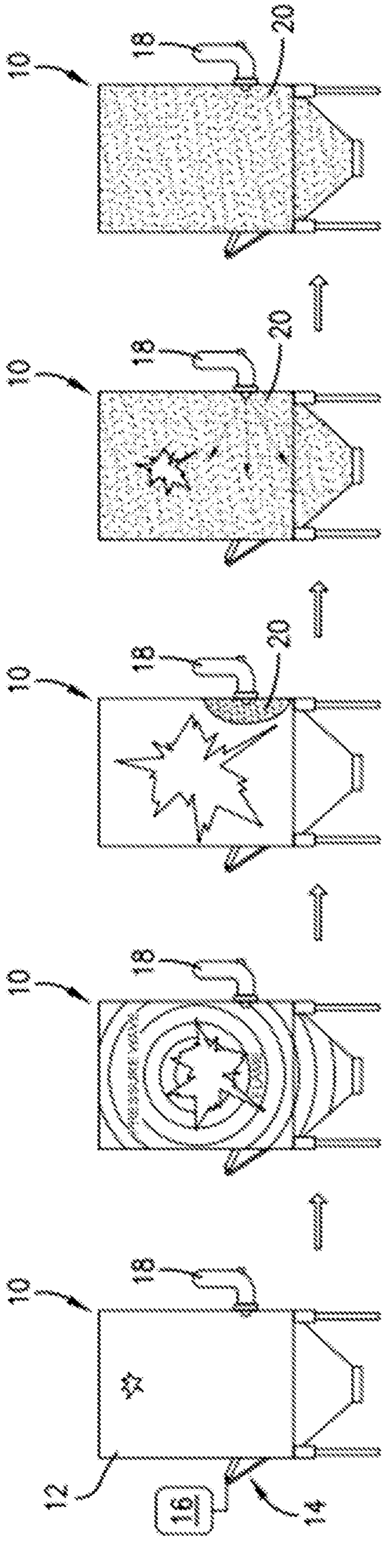
FIG. 1A is a block diagram of a system constructed in accordance with an embodiment of the present invention.
FIG. 1B is a block diagram of the system of FIG. 1A, wherein a dust explosion is occurring.
FIG. 1C is a block diagram of the system of FIG. 1A, wherein a suppression system has been activated.
FIG. 1D is a block diagram of the system of FIG. 1A, wherein the suppression system is in the process of suppressing the dust explosion.
FIG. 1E is a block diagram of the system of FIG. 1A, wherein the dust explosion has been suppressed.
Figure 2:
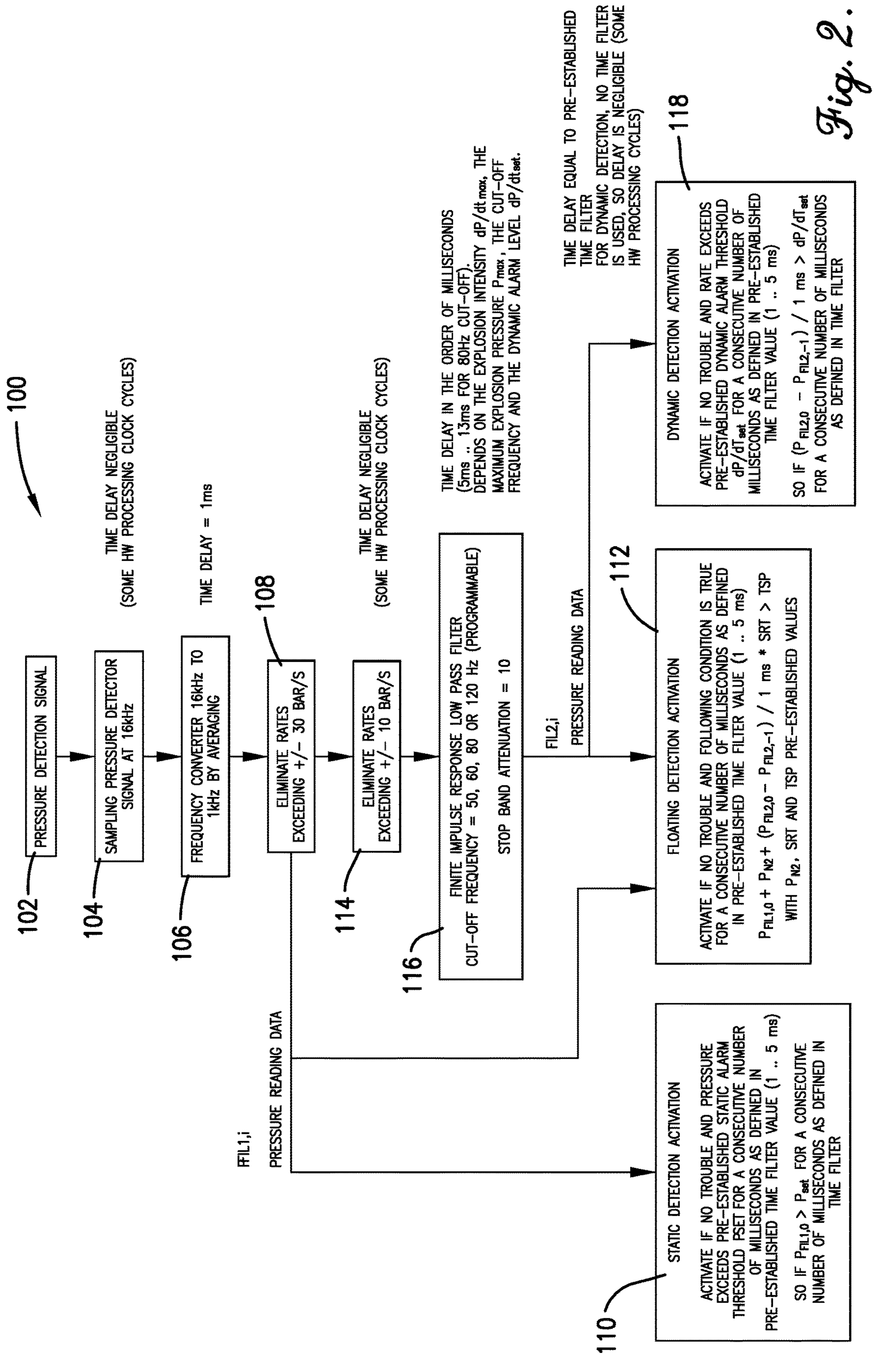
FIG. 2 is a flowchart of a method practiced in accordance with an embodiment of the present invention.

Broadly characterized, the present invention provides an explosion suppression system and associated method which provide faster and more reliable activation, and which are less influenced by variations in process parameters and explosion intensity. More specifically, the present invention uses an innovative digital filter technique in dynamic detection to provide improved stability against short duration pressure reading disturbances and also uses floating detection where not preset values for static pressure threshold or dynamic rate of pressure rise thresholds are used to activate the system, but where rather the real-time measured pressure and rate of pressure rise is compared against a preset threshold for the final maximum allowed explosion pressure in the system.

Broadly, improving stability against short duration pressure reading disturbances in dynamic detection may be accomplished by filtering noise in the pressure reading with a minimum loss of system response time before the alarm condition is checked. One or more digital low-pass frequency filters with appropriate stop band attenuation and appropriate cut off frequencies (fc) may be used. Further, finite impulse response filters with minimal phase shift/time delay may be used, rather than infinite impulse response filters. The stop band attenuation factor may be chosen so as to filter only the pressure reading noise caused by reflections of explosion pressure waves against the walls of a process enclosure, which may allow for setting the dynamic alarm threshold value relatively low (e.g., 1 bar/s). This may also allow for eliminating time filtering, and may keep the phase shift/time delay introduced by the attenuation as small as possible. High frequency pressure reading disturbances with amplitudes larger than the stop band attenuation may be "topped off" before passing the signal to a low pass filter.

Stability may be improved against short duration pressure reading disturbances with frequencies above the filter's cut-off frequency. A cut-off frequency of 80 Hz may be appropriate for most applications. The system may provide response times on the order of milliseconds, which allows the suppression system to activate at low explosion pressures. The response time may be predictable and may depend on the explosion intensity, $dP/dt_{max}$, the maximum explosion pressure, $P_{max}$, the filter's cut-off frequency, and the dynamic alarm level, $dP/dt_{set}$. Alternative cut-off frequencies may be chosen to balance stability against disturbances and system response time. If pressure reading disturbances are expected to occur with a frequency larger than the system's sampling frequency of 1000 Hz, a time filter in the order of 1 ms to 5 ms, in addition to the frequency filter, may help further increasing the stability of the system.

Floating detection may be accomplished by monitoring in real-time the static pressure (P(t)) and pressure rise (dP(t)/dt) and also calculating in real-time the predicted reduced explosion pressure if the system were activated immediately. The alarm and suppression system may activate when the calculated reduced pressure exceeds the pressure resistance of the process enclosure. Thus, the alarm condition may be adapted to the effective real-time measured explosion intensity.

The floating alarm condition may be expressed as:

$$P(t) + P_{N_2} + \frac{dP(t)}{dt} * SRT > TSP$$

wherein, the left side of the equation expresses the real-time calculated reduced pressure, and the right side expresses the explosion pressure resistance of the apparatus; P(t) and dP(t)/dt are real-time measured values, while $P_{N2}$, SRT, and TSP are pre-established; $P_{N2}$ is the pressure increase in the apparatus due to the injection of pressurized nitrogen from the suppression containers resistance of the apparatus; SRT (System Reaction Time) is the time required to extinguish the incipient explosion after activation; and TSP is the explosion pressure resistance of the apparatus.

The floating alarm condition is true for a specified consecutive amount of milliseconds, typically 3 ms, as with the static pressure detection. The delay introduced by the low pass filter and by waiting during the consecutive milliseconds that the floating alarm condition must be true, is added to the SRT used in the floating alarm condition equation. The pre-established parameters are well-controlled variables, which are independent of the properties of the process and the dust and dependent only on the properties of the process enclosure and the size and installation location of the suppressor containers.

Referring to FIGS. 1A-E and 2, embodiments of a system 10 and a method 100 for detecting and suppressing a dust explosion in a process enclosure in accordance with the present invention are described as follows. The system 10 may broadly comprise a pressure sensor 14, an electronic processing element 16, and a suppression system 18 configured to release a suppressant 20. The process enclosure 12 may be or may be part of a dryer for drying powdered material, a mill for reducing solid material to smaller pieces, a conveyor for transporting solid bulk materials, a silo for storing solid bulk materials, a dust collector for separating dust particles from an air stream, or any other process equipment in which an explosive dust-air cloud may arise during normal operation or during malfunction.

As illustrated in FIG. 1A, the pressure sensor 14 may be associated with the process enclosure 12 and configured to generate a pressure signal indicative of a pressure within the process enclosure 12, as shown in step 102. The electronic processing element 16 may be configured to analyze the pressure signal to determine whether the dust explosion is occurring, wherein analyzing the pressure signal may include the following steps. The pressure signal may be received by the processing element 16. The received pressure signal may be sampled at a first higher frequency of approximately between 2 kHz and 20 kHz, or approximately 16 kHz (i.e., once per 0.0625 ms), as shown in step 104. The time delay associated with this step may be negligible. The sampled pressure signal may be converted by averaging from the first higher frequency to a second lower frequency of approximately between 500 Hz and 1500 Hz, or approximately 1000 Hz (i.e., one data point per millisecond), as shown in step 106. The time delay associated with this step may be approximately one millisecond.

The converted pressure signal may be filtered with a first filter, which may be a non-linear filter, to remove a portion of the pressure signal where the rate of increase grows in one millisecond more than a first pre-established maximum magnitude of approximately between 10 bar/s and 40 bar/s, or approximately 30 bar/s, as shown in step 108. The time delay associated with this step may be negligible. The first filter may permanently delete the removed pressure reading data from the pressure signal. In particular, pressure increases that grow in one millisecond more than the maximum magnitude of, e.g., +/−30 bar/s, may be removed because they may occur due to a broken detector and may falsely activate the system and, if they occur in an explosion, they occur far beyond the alarm condition has occurred, whether it be static, dynamic or floating.

An exemplary algorithm for the first filter may be as follows:

```
If Abs(Abs (x0 − y−1)−Abs(y−1 − y−2)) > 30 mbarg Then
  y0 = y−1
Else
```

-continued

```
  y0 = x0
 End If
```

In this example, the x-values are the digital input to the first filter, and the y-values are the digital output, and the subscript denotes the time the values are captured. So, for example, subscript 0 denotes the current pressure reading, and subscript −1 denotes the pressure reading one millisecond earlier.

The first filtered pressure signal may be used to trigger static detection protection, as shown in step 110. In one implementation, static detection protection may be activated if the first filtered pressure signal exceeds the pre-established alarm threshold, $P_{set}$, for a pre-established number of milliseconds (e.g., between 1 and 5 milliseconds). The first filtered pressure signal may additionally or alternatively be used, in combination with the second filtered pressure signal as described below, to trigger floating detection protection, as shown in step 112.

In one implementation, floating detection protection may be activated if:

$$P_{FIL1,0} + P_{N2} + \frac{(P_{FIL2,0} - P_{FIL2,-1})}{1\text{ ms}} \times SRT > TSP$$

wherein $P_{FIL1,0}$ is the first filtered pressure signal, $P_{FIL2,0}$ and $P_{FIL2,-1}$ are the second filtered pressure signal (discussed below) at times 0 and −1, and $P_{N2}$, SRT, and TSP are pre-established values.

The first filtered pressure signal may be filtered with an intermediate filter, which may be a non-linear filter, to remove a portion of the first filtered pressure signal having a rate of increase exceeding a second pre-established maximum magnitude of approximately between 5 bar/s and 15 bar/s, or approximately 10 bar/s, as shown in step 114. The time delay associated with this step may be negligible. The intermediate filter may permanently delete the removed pressure reading data from the pressure signal. In particular, pressure increases that exceed the maximum magnitude of, e.g., +/−10 bar/s, may be removed because dynamic detection alarm levels exceeding 10 bar/s may not be needed for effective protection. Furthermore, explosion pressure data may pass a region of lower rates before 10 bar/s is reached and may therefore be detected by dynamic alarm values of 10 bar/s or lower.

An exemplary algorithm for the intermediate filter may be as follows:

```
If Abs (x0 − x−1) > 1 mbarg Then <comment> Output follows input but
rates are truncated <end comment>
  If x0 − x−1 > 30 mbarg Then
    y0 = y−1 + 30 mbarg
  Elseif x0 − x−1 < − 30 mbarg Then
    y0 = y−1 − 30 mbarg
  Else
    y0 = y−1 + x0 − x−1
  End If
Else <comment> After shock output shall align with input again<end
comment>
  If Abs (x0 − y−1) <= 1 mbarg Then
    y0 = x0
  Elseif x0 > y−1 Then
    y0 = y−1 + 1 mbarg
  Else
    y0 = y−1 − 1 mbarg
```

-continued

```
  End If
End If
```

The intermediate filtered pressure signal may be filtered with a second filter, which may be a finite impulse response digital low pass filter, having a cut-off frequency of approximately between 40 Hz and 120 Hz, or approximately 50 Hz to 120 Hz, a stop band attenuation factor of approximately between 8 and 12, or approximately 10, and an end of passband frequency of approximately between 0 Hz and 2 Hz, or approximately 1 Hz, as shown in step 116. In particular, the cut-off frequency may be 50 Hz, 60 Hz, 80 Hz, or 120 Hz. The time delay associated with this step may be measured in milliseconds (e.g., 5 ms to 13 ms for a cut-off frequency of 80 Hz). As used herein, "finite impulse response" may refer to a filter in which the output of the filter is calculated as a weighted average of the current and a defined amount of historical input data. Several techniques exist to find the appropriate length, N, of the filter and the appropriate values for the weight factors H0 . . . HN−1 meeting the required frequency response.

The second filtered pressure signal may be used, in combination with the first filtered pressure signal as described above, to trigger the floating detection protection, as shown in step 112 and as described above. The second filtered pressure signal may additionally or alternatively be used to trigger dynamic detection protection, as shown in step 118. The time delay associated with this step may be on the order of a few milliseconds. In one implementation, dynamic detection protection may be activated if:

$$\frac{(P_{FIL2,0} - P_{FIL2,-1})}{1\text{ ms}} > \frac{dP}{dt_{set}}$$

wherein $P_{FIL2,0}$ and $P_{FIL2,-1}$ are the second filtered pressure signal at times 0 and −1, and $dP/dt_{set}$ is a pre-established dynamic alarm threshold.

As illustrated in FIGS. 1B-E, an alarm and the suppression system 18 may be activated by the triggering of any one or more of the static alarm detection, the floating alarm detection, and/or the dynamic alarm detection. More specifically, an explosion is detected (FIG. 1B), and the suppression system 18 is caused to release the suppressant 20 to extinguish the explosion (FIGS. 1C-1D).

Figure 3A:
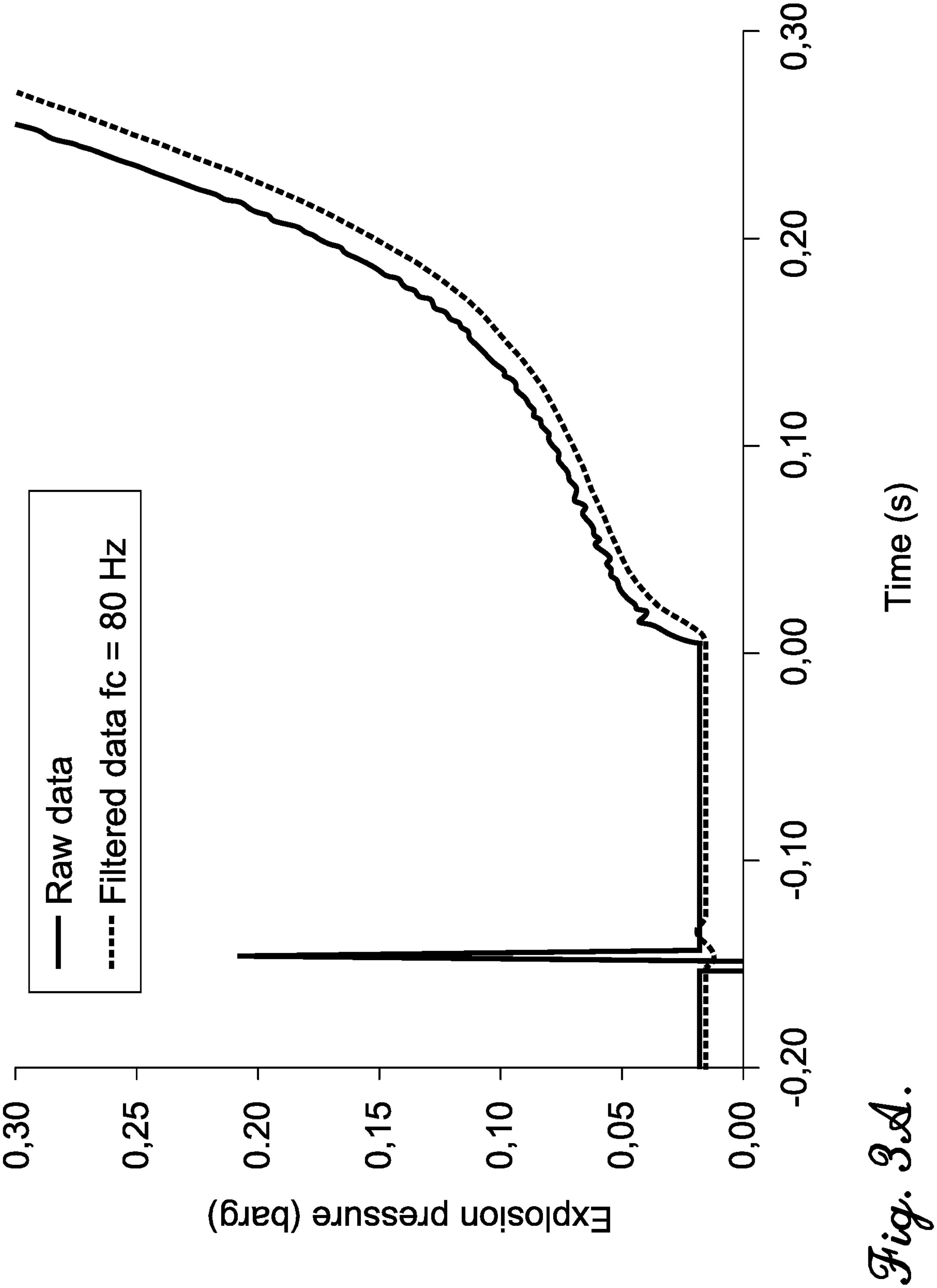
FIG. 3A is a plot of exemplary raw and filtered pressure data for a short duration disturbance.
Figure 3B:
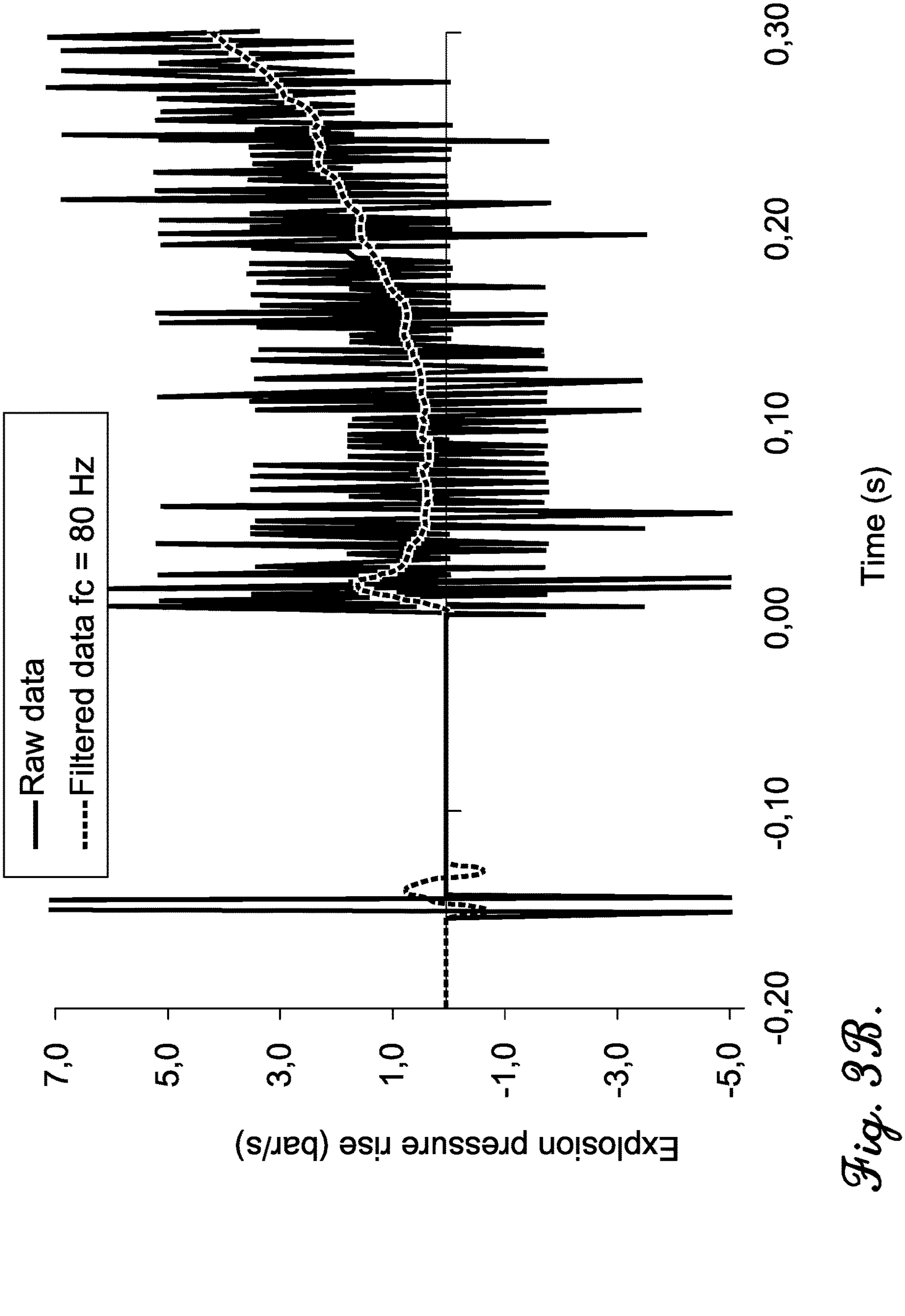
FIG. 3B is a plot of exemplary raw and filtered pressure data during a dust explosion.

FIG. 3A shows a plot 200 of exemplary raw and filtered data for a short duration disturbance of amplitude 200 mbarg and frequency 100 Hz before an explosion is ignited, and FIG. 3B shows a plot 202 of exemplary raw and filtered data during the explosion. The smoothing and delay of pressure readings due to the filtering are clearly visible. The rate of the disturbance is attenuated to below 1 bar/s by the filter, and, as a result, no time filtering may be required in dynamic detection protection. The smoothing function allows for activating the suppression system 18 as soon as the filtered explosion pressure rate of rise exceeds the pre-established threshold $dP/dt_{set}$.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

I claim:

1. A method for detecting and suppressing a dust explosion occurring in a process enclosure, the method comprising the steps of:

generating with a pressure sensor a pressure signal indicative of a pressure within the process enclosure; and analyzing with an electronic processing element the pressure signal to determine whether the dust explosion is occurring, wherein analyzing the pressure signal includes— sampling the received pressure signal at a higher frequency, converting the sampled pressure signal from the higher frequency to a lower frequency, filtering the converted pressure signal with a first filter to remove a first portion of the pressure signal having a rate of increase that grows over one millisecond with more than a first pre-established maximum magnitude, filtering the first filtered pressure signal with an intermediate filter to remove a second portion of the pressure signal having a rate of increase exceeding a second pre-established maximum magnitude, filtering the intermediate filtered pressure signal with a second filter having a cut-off frequency, a stop band attenuation factor, and an end of passband frequency, and activating a suppression system if the first filtered pressure signal exceeds a pre-established static pressure threshold value or if the rate of increase of the second filtered pressure signal exceeds a pre-established rate-of-increase threshold value or if the total suppressed pressure predicted on the basis of the first and second filtered pressure signal exceeds a pre-established equipment strength value, each of which indicates, alternatively or additionally, the dust explosion occurring in the process enclosure.

2. The method as set forth in claim 1, wherein the process enclosure is selected from the group consisting of: dryers for drying powdered materials, mills for reducing solid materials to smaller pieces, conveyors for transporting solid bulk materials, silos for storing solid bulk materials and dust collectors for separating dust particles from an air stream.

3. The method as set forth in claim 1, wherein the higher frequency is approximately between 2 kHz and 20 kHz, and the lower frequency is approximately between 500 Hz and 1500 Hz.

4. The method as set forth in claim 3, wherein the higher frequency is approximately 16 kHz, and the lower frequency is approximately 1000 Hz.

5. The method as set forth in claim 1, wherein the first filter is a non-linear filter.

6. The method as set forth in claim 1, wherein the first pre-established maximum magnitude is approximately between 20 bar/s and 40 bar/s.

7. The method as set forth in claim 6, wherein the first pre-established maximum magnitude is approximately 30 bar/s.

8. The method as set forth in claim 1, wherein the intermediate filter is a non-linear filter.

9. The method as set forth in claim 1, wherein the second pre-established maximum magnitude is approximately between 5 bar/s and 15 bar/s.

10. The method as set forth in claim 9, wherein the second pre-established maximum magnitude is approximately 10 bar/s.

11. The method as set forth in claim 1, wherein the second filter is a digital low pass filter.

12. The method as set forth in claim 11, wherein the second filter is a finite impulse response digital low pass filter.

13. The method as set forth in claim 1, wherein the cut-off frequency is approximately between 40 Hz and 120 Hz, the stop band attenuation factor is approximately between 8 and 12, and the end of passband frequency is approximately between 0 Hz and 2 Hz.

14. The method as set forth in claim 13, wherein the cut-off frequency is approximately between 50 Hz and 120 Hz, the stop band attenuation factor is approximately 10, and the end of passband frequency is approximately 1 Hz.

15. The method as set forth in claim 1, further including the step of activating an alarm in addition to the suppression system.

16. A method for detecting and suppressing a dust explosion occurring in a process enclosure, the method comprising the steps of:

generating with a pressure sensor a pressure signal indicative of a pressure within the process enclosure; and analyzing with an electronic processing element the pressure signal to determine whether the dust explosion is occurring, wherein analyzing the pressure signal includes— sampling the received pressure signal at a higher frequency of approximately between 2 kHz and 20 kHz, converting the sampled pressure signal from the higher frequency to a lower frequency of approximately between 500 Hz and 1500 Hz, filtering the converted pressure signal with a first filter to remove a first portion of the pressure signal having a rate of increase exceeding a first pre-established maximum magnitude of approximately between 20 bar/s and 40 bar/s, filtering the first filtered pressure signal with an intermediate filter between the first and second filters to remove a second portion of the pressure signal having a rate of increase exceeding a second pre-established maximum magnitude of approximately between 5 bar/s and 15 bar/s, filtering the intermediate filtered pressure signal with a second filter having a cut-off frequency of approximately between 50 Hz and 120 Hz, a stop band attenuation factor of approximately between 8 and 12, and an end of passband frequency of approximately between 0 Hz and 2 Hz, and activating a suppression system if the first filtered pressure signal exceeds a pre-established static pressure threshold value or if the rate of increase of the second filtered pressure signal exceeds a pre-established rate-of-increase threshold value or if the total suppressed pressure predicted on the basis of the first and second filtered pressure signal exceeds a pre-established equipment strength value, each of which indicates, alternatively or additionally, the dust explosion occurring in the process enclosure.

17. A system for detecting and suppressing a dust explosion occurring in a process enclosure, the system comprising:

a pressure sensor configured to generate a pressure signal indicative of a pressure within the process enclosure; and an electronic processing element configured to analyze the pressure signal to determine whether the dust explosion is occurring, wherein the electronic processing element is configured to— sample the received pressure signal at a higher frequency, convert the sampled pressure signal from the higher frequency to a lower frequency, filter the converted pressure signal with a first filter to remove a first portion of the pressure signal having a rate of increase that grows over one millisecond with more than a first pre-established maximum magnitude, filter the first filtered pressure signal with an intermediate filter to remove a second portion of the pressure signal having a rate of increase exceeding a second pre-established maximum magnitude, filter the intermediate filtered pressure signal with a second filter having a cut-off frequency, a stop band attenuation factor, and an end of passband frequency, and activate a suppression system if the first filtered pressure signal exceeds a pre-established static pressure threshold value or if the rate of increase of the second filtered pressure signal exceeds a pre-established rate-of-increase threshold value or if the total suppressed pressure predicted on the basis of the first and second filtered pressure signal exceeds a pre-established equipment strength value, each of which indicates, alternatively or additionally, the dust explosion occurring in the process enclosure.

18. The system as set forth in claim 17, wherein the process enclosure is selected from the group consisting of: dryers for drying powdered materials, mills for reducing solid materials to smaller pieces, conveyors for transporting solid bulk materials, silos for storing solid bulk materials and dust collectors for separating dust particles from an air stream.

19. The system as set forth in claim 17, wherein the higher frequency is approximately between 2 kHz and 20 kHz, and the lower frequency is approximately between 500 Hz and 1500 Hz.

20. The system as set forth in claim 19, wherein the higher frequency is approximately 16 kHz, and the lower frequency is approximately 1000 Hz.

21. The system as set forth in claim 17, wherein the first filter is a non-linear filter.

22. The system as set forth in claim 17, wherein the first pre-established maximum magnitude is approximately between 20 bar/s and 40 bar/s.

23. The system as set forth in claim 22, wherein the first pre-established maximum magnitude is approximately 30 bar/s.

24. The system as set forth in claim 17, wherein the intermediate filter is a non-linear filter.

25. The system as set forth in claim 17, wherein the second pre-established maximum magnitude is approximately between 5 bar/s and 15 bar/s.

26. The system as set forth in claim 25, wherein the second pre-established maximum magnitude is approximately 10 bar/s.

27. The system as set forth in claim 17, wherein the second filter is a digital low pass filter.

28. The system as set forth in claim 27, wherein the second filter is a finite impulse response digital low pass filter.

29. The system as set forth in claim 17, wherein the cut-off frequency is approximately between 40 Hz and 120 Hz, the stop band attenuation factor is approximately between 8 and 12, and the end of passband frequency is approximately between 0 Hz and 2 Hz.

30. The system as set forth in claim 29, wherein the cut-off frequency is approximately between 50 Hz and 120 Hz, the stop band attenuation factor is approximately 10, and the end of passband frequency is approximately 1 Hz.

31. The system as set forth in claim 17, wherein the electronic processing element is further configured to activate an alarm in addition to the suppression system.

* * * * *